Figure 1:
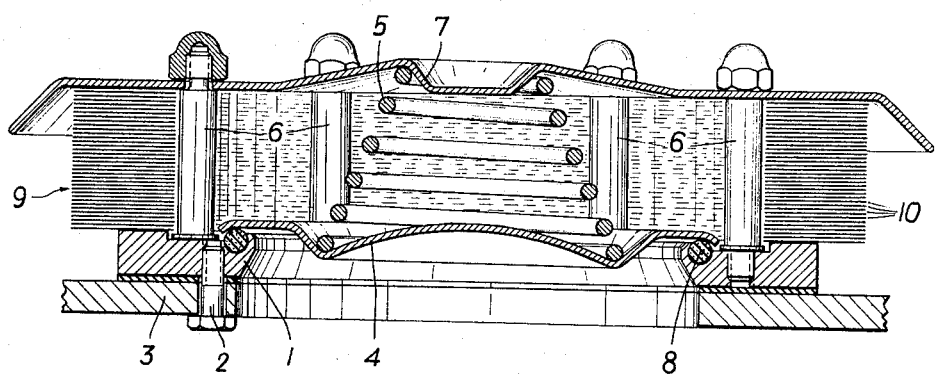

United States Patent
Grunwald et al.

[15] 3,661,295
[45] May 9, 1972

[54] EXPLOSION RELIEF VALVE

[72] Inventors: Eduard Grunwald, Port Washington; Walter J. Tuymer, Forest Hills, both of N.Y.

[73] Assignee: Hoerbiger Ventilwerke Aktiengesellschaft, Vienna, Austria

[22] Filed: Mar. 12, 1970

[21] Appl. No.: 19,040

[30] Foreign Application Priority Data

Feb. 13, 1970 Austria..................1308/70

[52] U.S. Cl..................220/88 A, 60/39.11, 123/198 D, 181/37
[51] Int. Cl..................B65d 25/00
[58] Field of Search............220/88 A, 24 B, 24 C, 24 R, 220/88; 222/189; 48/192; 137/73; 181/37, 60; 60/39.11; 123/198 D, 198 E

[56] References Cited

UNITED STATES PATENTS

| 3,016,913 | 1/1962 | Bargmann | 220/88 X |
| 1,799,565 | 4/1931 | Patterson | 220/88 A |
| 1,983,417 | 12/1934 | Tokheim | 220/88 A |
| 2,160,684 | 5/1939 | Spaeth | 220/88 A |
| 723,111 | 3/1903 | Winton | 181/60 X |
| 1,134,838 | 4/1915 | Gaumer | 220/88 A |
| 1,240,682 | 9/1917 | Crompton | 220/88 A |
| 1,800,977 | 4/1931 | Anschicks | 48/192 |
| 2,152,422 | 3/1939 | Tokheim | 220/88 A |
| 2,821,991 | 2/1958 | Marx | 48/192 X |

FOREIGN PATENTS OR APPLICATIONS

| 241,925 | 10/1909 | Germany | 220/88 A |

Primary Examiner—M. Henson Wood, Jr.
Assistant Examiner—Edwin D. Grant
Attorney—Watson, Cole, Grindle & Watson

[57] ABSTRACT

An explosion relief valve for use especially to be applied to a crankcase of internal combustion engines and consisting of a spring loaded closing plate built into a limiting wall of the crankcase and having a flame barrier in the form of stacked metal strips cooperating with the valve seat.

4 Claims, 5 Drawing Figures

Inventors
Edvard Grunwald
Walter J. Tuymer
By Watson, Cole, Grindle & Watson
Attys.

EXPLOSION RELIEF VALVE

This invention relates to an explosion relief valve for closed spaces, especially for application in a crankcase of internal combustion engines with a valve seat built into a limiting wall of the space that is to be protected. A spring loaded closing plate cooperates with the valve seat and a flame barrier is provided built into the gas path leading through the valve seat, the barrier consisting of a structure having a large number of small openings.

Closed spaces, in which an explosion could cause damage or destruction is designed to be protected by providing relief valves built into one or several limiting walls of said spaces, during an explosion which would release a sufficiently large cross-section for the escape of gases in order to avoid the development of a dangerous excess pressure inside the space. For example, such safety valves for guarding against explosions are built into the wall of the crankcase of diesel engines operating in accordance with two-stroke operation; and are built into ship engines, in order to avoid damage to the crankcase in the event of oil vapor explosions. Other examples for the use thereof, are gas containers, fairly large pipe lines and other spaces in which explosive substances have been stored or in which easily combustible gases can develop. Above all, it is sometimes required moreover in the case of ship engines, that the explosion relief valves be provided with a device to prevent, during an explosion, the escape of flames from the relief valves. For this purpose flame barriers have been utilized which consist of a structure with a large number of small openings and which are connected in series with the relief valve, either outside or inside the space to be protected.

The known flame barriers consist of one or multilayered wire nets or of baskets made of wire mesh which are penetrable by gas and which have a relatively large surface. When the explosive gases penetrate through such a net, the gases are cooled down by release of heat to the net so that the escape of flame behind the net will be prevented. The meshwork must be of relatively narrow mesh and must be arranged in several layers one behind the other, so that a sufficiently large surface will develop for the absorption of heat. Such flame barriers, therefore, have the considerable disadvantage that they largely increase the flow resistance of the relief valve as a result of which in most cases no sufficiently rapid relief will be guaranteed.

It has furthermore, been known to apply an evaporable substance either in liquid or solid form to a flame barrier of this type, which substance will smother the flame upon passage through the meshwork or cools it off by withdrawal of heat. The application of an evaporable substance and maintenance of a sufficient supply, however, is cumbersome and requires complicated installations such as atomizers or other spray installations. Usually such flame barriers are built inside the crankcase of combination engines where they are wetted down with the oil used for lubrication of the engine elements moving in the crankcase. In that case the danger exists in that during an explosion, hot oil vapors escape through the relief valve and cause damage outside the space that is to be protected and constitute a danger to individuals. Besides, oil residues will form on the flame barrier which, especially during the occurrence of relatively small explosions, will burn on the grate or the meshwork, whereby they narrow down the small openings of the flame barrier or plug it up altogether, so that a safe pressure relief and the safety action of the relief valve is lessened.

It is therefore an object of the invention to provide a relief valve with an improved flame barrier which can be made more simply, which has only a relatively low flow resistance and which has a sufficiently great heat absorptive capacity without application of evaporative substances for safely avoiding penetration of flames. According to the invention, this is achieved by the fact that the flame barrier is formed from strips of sheet metal stacked one above the other which are corrugated at least partly or at least over a part of their width. By being corrugated, openings will develop without the arrangement of special distancers between the strips of sheet metal so that the explosive gases can flow off largely unimpeded along the strips of the metal sheets. During the flow along the metal strips, which have a large surface for heat absorption and which act in the manner of cooling vanes, the explosive gases are quickly cooled down as a result of which the occurrence of a flame on the outside of the flame barrier will be safely prevented. The capacity of the flame barrier for heat absorption can be adapted to the pertinent requirements by selection of the width of the metal strips and of the material of these strips without unduly increasing the flow resistance, since no reversal or deflection of the gases whatsoever occurs between the strips of metal, and said gases can flow off in a straight line. The application of oil or other evaporable substances is not necessary in the case of the flame barrier according to this invention.

The metal strips stacked one on top of the other according to the invention can be formed from sections lying one on top of the other of a continuous band which consists preferably of aluminum and which has been wound in a helical shape around an axis running perpendicular to its plane. This will result in a flame barrier consisting of corrugated ring-shaped metal strips arranged one on top of the other which can be produced particularly simply and which can be easily built into the relief valve since it consists of only a single continuous metal pack.

According to another characteristic feature of the invention, the height of the undulations can decrease continuously radially toward the outside from the inside edge of the metal strips. The stacked metal strips touch merely at their inside edges in the area of the individual undulations so that the cross-section of flow continuously widens from this narrowest spot in the direction of flow of the explosive gases. As a result thereof, an effect in the manner of diffuser is achieved whereby the explosive gases expand still within the flame barrier between the metal strips and at the same time and, additionally, are cooled down so that the protection against flames will be even further improved. Additionally to this or alternative with this, the undulations of the metal strips starting out from the inside edge of the said strips can extend at the most over half their width, a measure which contributes likewise to the lessening of the flow resistance of the flame barrier and to a further improvement of the cooling of the explosive gases.

In order to prevent the undulations from intermeshing in the manner of a gear during the stacking of the metal strips and thereby unduly limiting the cross-section of the flame barrier which is open and available for the flow through, the individual undulations can be produced irregularly so as to have a varying height and width. In order to assure a sufficient cross-sectional passage, the metal strips adjoining each other directly can be arranged twisted by about half the average width of the undulations in relation to one another in a peripheral direction, as a result of which at least one part of the troughs of the waves of a metal strip will rest on the crests of the waves of the metal strip lying underneath. The required cross-section for passage will also be safely held open whenever metal strips undulating in accordance with the invention alternate with essentially flat metal strips. All these measures can be used either as flame barriers consisting of stacked individual annular metal strips or as bands wound helically for the formation of said barriers.

The flame barrier according to the invention has proven itself particularly advantageous as an explosion relief valve where the closing plate is loaded with a compression spring which is supported by a catcher in the form of a cover sheet held at a distance from the valve seat by spacer bolts arranged outside the edge of the closing plate. At the same time, the metal strips of the metal band wound to form them have been arranged concentrically around the spacer bolts and are held firmly between the valve seat and the catcher. With such construction of the relief valve, no constructional changes or assembly arrangements are required for the attachment of the flame barrier according to the invention so that the same valve can be used with or without a flame barrier, if desired. Therefore the flame barrier according to the invention, can be built in simply and quickly and even subsequently whenever a flame barrier should prove to be desirable and it can be removed just as quickly if it is not required as where an unimpeded flow off of the explosive gases of a flame barrier is preferred.

Figure 2:
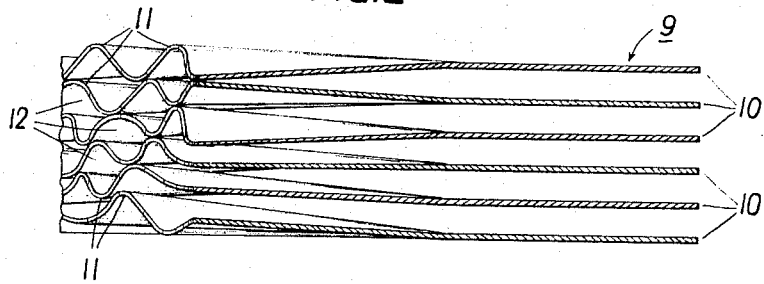
Figure 3:
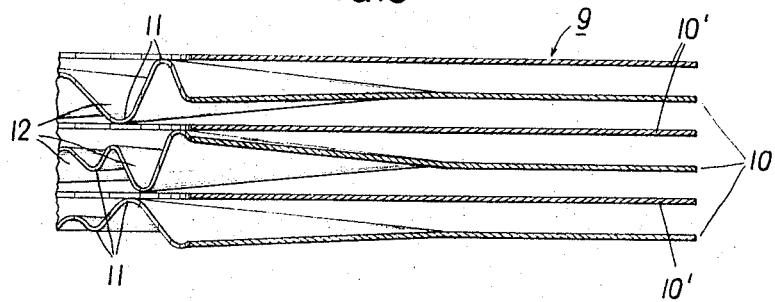
Figure 4:
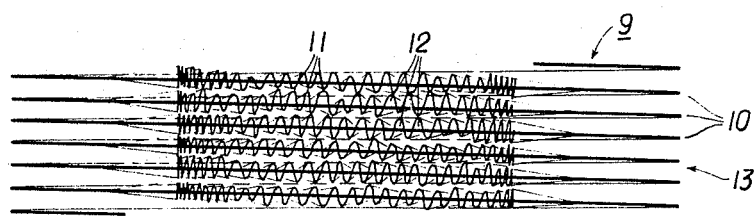
Figure 5:
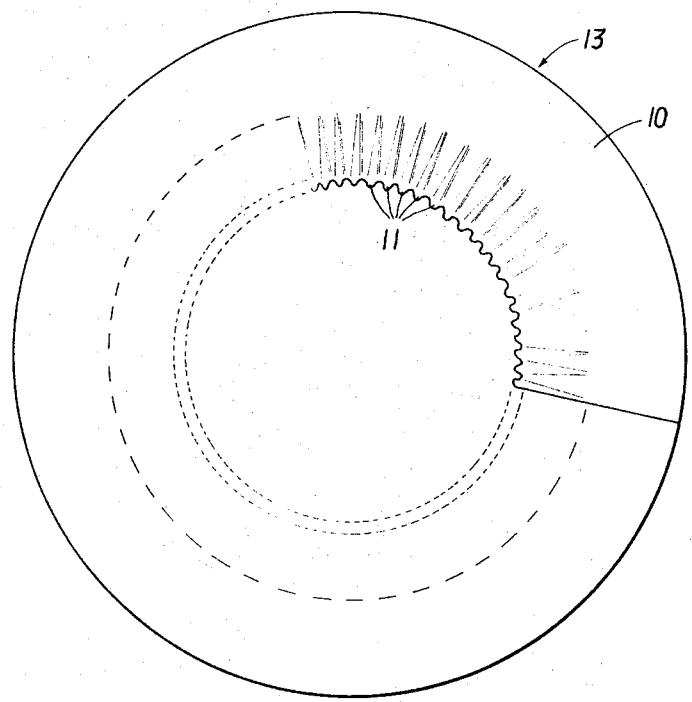

Further objects of the invention will be apparent from the following description when considered in connection with the accompanying drawings in which;

FIG. 1 is a cross-sectional view of an explosion relief valve with the flame barrier according to the invention, FIGS. 2 and 3 are enlarged sectional views showing two different embodiments of the flame barrier in axial sections, FIG. 4 is a diagrammatic side view of another embodiment of the flame barrier, and FIG. 5 shows the base plan view of the flame barrier of FIG. 4.

The explosion relief valve shown in FIG. 1 is suitably designed for ship engines and is built into the wall of the crankcase in order to avoid damage to the crankcase in the event of an explosion. The valve consists of an annular valve seat 1 which has been attached by means of screws or bolts 2 to an opening in the wall 3 of the crankcase. A closing plate 4 cooperates with the valve seat 1 and is loaded by means of a compression spring 5 wound approximately cone shaped. Moreover, spacer bolts 6 are threaded into the valve seat 1 concentrically around the closing plate 4, the bolts 6 holding down a catcher 7 at a distance from valve seat 1, the catcher being designed as a sheet metal cover and serving as a lateral guide for closing plate 4. The compression spring 5 is supported by the catcher 7. A seal ring 8, inserted into a groove of the valve seat 1, produces a tight closure for the relief valve in the closed position of the closing plate 4.

The relief valve has been provided with a flame barrier 9 which is built into the gas path leading through the opening of the valve seat 1. In the embodiment shown by way of example, the flame barrier 9 has been arranged concentrically around the spacer bolts 6 on the outside of the relief valve. The barrier consists of stacked metal strips 10 of a design which is undulated across a part of their width and are clamped loosely between the valve seat 1 and the catcher 7.

As becomes apparent in FIG. 2, the undulations 11 commence from the inside edge of the metal strips 10 and extend to about half the width of said strips. The height of the undulations 11 decreases continuously radially toward the outside from the inside edge of the metal strips 10, so that half the metal strips 10 lying on the outside is practically flat. Furthermore the individual undulations 11, and both the undulations of a metal strip 10 which follow each other in a peripheral direction as well as the undulations of different metal strips 10, have been developed irregularly thereby resulting in differing heights and widths. The undulations 11 of the metal strips 10 lying on top of one another cannot, as a result thereof, engage with one another in the manner of a gear, but they lie on top of one another in such a way that the metal strips 10 lie flat at their free ends and are held at a distance from one another in the manner of cooling vanes although the undulated inside lying part openings 12 are of a varying size with different shapes between undulations 11. Insofar as the individual undulations 11 of the oppositely stacked metal strips 10 touch each other, as in the case of the largest undulations, the troughs of the waves of one metal strip 10 will lie on the crests of the waves of the metal strip 10 arranged therebeneath. The undulations 11, however, can also be developed regularly with the same size, although the individual metal strips 10 must be arranged twisted by about half the average width of the undulations in relation to one another.

In the embodiment according to FIG. 3, by way of example, the metal strips 10 provided with undulations 11 alternate with flat metal strips 10'. As a result thereof openings 12 will develop between the undulations 11 and the individual metal strips 10' so that the undulations will be held at a distance from one another. In the structure shown in FIG. 4, the metal strips 10 are formed by a continuous band 13, which has been wound in the shape of a helix around its axis running perpendicular in relation to its plane. As FIG. 5 shows, the metal band 13 wound in the shape of a helix has also been provided with undulations 11 starting out from its inside edge. The screw windings of the metal band 13 at the same time form the metal strips 10 lying one on top of the other which are held at a distance from one another by the undulations 11 and which leave openings 12 for the explosive gases between the undulations 11. In the embodiment according to FIGS. 4 and 5 by way of example, one is thus dealing with a single flame barrier 9 consisting only of the undulated and wound metal band 13.

The method of operation of the explosion relief valve according to the invention is as follows: Whenever a gas explosion occurs in the crankcase into the limiting wall 3 of which the relief valve has been built in, the closing plate 4 will promptly be lifted from the valve seat 1 counter to the force of the spring 5, as a result of a sudden pressure increase developing thereby in the crankcase, which will move the closing plates as far as the catcher 7. The opening of the valve seat 1 will be released as a result of which the explosive gases can flow off through the valve seat 1 and through the flame barrier 9 toward the outside so that a rapid pressure relief will occur in the crankcase. The flame barrier 9 at the same time causes an extinction of the flame and prevents an escape thereof through the relief valve to the outside.

The hot explosive gases or exhaust gases escaping through the open valve seat 1 will move through the openings 12 between the metal strips 10 and will flow radially along said strips to the outside. Since the metal strips 10 have a relatively large surface and act like cooling vanes, they have a correspondingly large capacity for heat absorption and cause a rapid cooling of the gases flowing therealong. Advantageously the metal strips 10 consist of a good heat conductive material, especially of aluminum or copper. Since the cross-section for the flow available for the passage is continuously enlarged radially outwardly from the inside edge of the metal strips 10, the hot gases can expand subsequently to the openings 12 between the metal strips 10 as a result of which their temperature will be further decreased. Upon escape at the outside of the flame barrier 9, the gases therefore have been cooled off to such a point that ignition is no longer possible nor does any other danger exist for the space outside the relief valve. Especially individuals who are in the vicinity of the relief valve or individuals who are walking past it are no longer in danger from escaping flames or from hot explosive gases or oil vapors.

We claim:

1. Explosion relief valve for closed spaces, especially for the crankcase of internal combustion engines, comprising a valve seat built into a limiting wall of the space that is to be protected, a spring-loaded closing plate cooperating with said valve seat, and a flame barrier built into the path of gas leading through the valve seat and consisting of a structure having a large number of openings, the flame barrier being composed of stacked metal strips having corrugated sections at least in part over at least a part of their width, the corrugated sections being composed as individual undulations developed irregularly, whereby they have varying heights and widths so that at least one part of the troughs of the waves of a metal strip rest on the crests of the waves of the metal strip below it.

2. Explosion relief valve according to claim 1, in which the corrugations comprise undulations starting out from the inside edge of the metal strips and extending, at the most, over half its width.

3. Explosion relief valve according to claim 1, in which the height of the corrugated sections decreases continuously radially toward the outside from the inside edge of the metal strips.

4. Explosion relief valve according to claim 1, in which spring loading for the plate comprises a compression spring supported by a catcher developed as a cover metal sheet, the catcher being held at a distance from the valve seat by spacer bolts arranged at the edge of the closing plate, the metal strips representing the flame barrier being formed by sections of a continuous band having irregularly developed undulations and lying one on top of the other, said band being wound in the shape of a helix around an axis running perpendicularly in relation to its plane and being arranged concentrically around the spacer bolts and held firmly by clamping between the valve seat and the catcher.

* * * * *